United States Patent
Lee et al.

(10) Patent No.: US 7,907,913 B2
(45) Date of Patent: Mar. 15, 2011

(54) APPARATUS AND METHOD FOR DETERMINING BEAMFORMING VECTOR IN A CODEBOOK-BASED BEAMFORMING SYSTEM

(75) Inventors: Jong-Hyeuk Lee, Anyang-si (KR);
Myeon-Kyun Cho, Seongnam-si (KR);
Seung-Hoon Nam, Seoul (KR);
Jae-Yeun Yun, Bucheon-si (KR);
Yong-Hoon Lee, Deajeon (KR);
Sae-Young Chung, Deajeon (KR);
Jihoon Choi, Gyeongnam (KR)

(73) Assignees: Korea Advanced Institute of Science and Technology (KAIST) (KR); Samsung Electronics Co., Ltd (KR)

( * ) Notice: Subject to any disclaimer, the term of this patent is extended or adjusted under 35 U.S.C. 154(b) by 1074 days.

(21) Appl. No.: 11/702,432

(22) Filed: Feb. 5, 2007

(65) Prior Publication Data
US 2007/0206626 A1    Sep. 6, 2007

(30) Foreign Application Priority Data
Feb. 3, 2006    (KR) .................. 10-2006-0010749

(51) Int. Cl.
*H04B 1/00* (2006.01)
*H04B 7/00* (2006.01)

(52) U.S. Cl. ........................................ 455/69
(58) Field of Classification Search ............ 455/69, 455/561, 562.1, 63.4, 25, 127.2
See application file for complete search history.

(56) References Cited

U.S. PATENT DOCUMENTS
2007/0042717 A1 * 2/2007 Alexiou et al. .............. 455/69

FOREIGN PATENT DOCUMENTS
| | | |
|---|---|---|
| KR | 1020010095535 | 11/2001 |
| KR | 1020040002179 | 1/2004 |
| KR | 1020040049195 | 6/2004 |
| KR | 1020050009345 | 1/2005 |
| KR | 1020050013009 | 2/2005 |
| KR | 1020050050829 | 6/2005 |
| KR | 1020050087611 | 8/2005 |
| WO | WO 98/10525 | 3/1998 |

* cited by examiner

*Primary Examiner* — Eugene Yun
(74) *Attorney, Agent, or Firm* — The Farrell Law Firm, P.C.

(57) ABSTRACT

An apparatus and method for determining a beamforming vector in a codebook-based transmission beamforming system are provided. In a feedback method for a receiver in a codebook-based transmission beamforming system, forthcoming channel values for a forthcoming period are generated using M present and previous channel estimates. Effective channel gains for all transmission beamforming vectors included in a codebook are calculated using the forthcoming channel values. A codebook index corresponding to the maximum effective channel gains is fed back to a transmitter.

14 Claims, 10 Drawing Sheets

APPARATUS AND METHOD FOR DETERMINING BEAMFORMING VECTOR IN A CODEBOOK-BASED BEAMFORMING SYSTEM

PRIORITY

This application claims priority under 35 U.S.C. § 119 to an application filed in the Korean Intellectual Property Office on Feb. 3, 2006 and assigned Ser. No. 2006-10749, the contents of which are incorporated herein by reference.

BACKGROUND OF THE INVENTION

1. Field of the Invention

The present invention relates generally to a codebook-based beamforming system, and, in particular, to an apparatus and method for determining a transmission beamforming vector, taking a time-variant channel into account in a codebook-based Multiple Input Multiple Output (MIMO)-Orthogonal Frequency Division Multiplexing (OFDM) communication system.

2. Description of the Related Art

A MIMO system with a plurality of transmit antennas and a plurality of receive antennas provides spatial diversity that mitigates the signal level variation of a fading channel. A narrow-band MIMO system can acquire a diversity gain as high as the product of the numbers of transmit and receive antennas. Without knowledge of Channel State Information (CSI), a transmitter achieves diversity gain using a variety of space-time codes. If the transmitter has knowledge of CSI, it acquires spatial diversity gain by simple transmission beamforming and reception combining.

With knowledge of CSI, array gain as well diversity gain of the same order as a space-time code can be achieved, thereby remarkably increasing system performance. Yet, the transmission beamforming technique is viable only if the transmitter has knowledge of a transmission beamforming vector. In a Frequency Division Duplexing (FDD) system using different channels on the downlink and uplink, a receiver should feed back the transmission beamforming vector to the transmitter.

The introduction of OFDM facilitates application of transmission beamforming techniques designed for narrow-band systems to broadband systems. Typically, a MIMO-OFDM system converts a broadband MIMO channel to a set of narrow-band MIMO channels. Each narrow-band MIMO channel corresponds to a subcarrier. The use of a transmission beamforming technique in the MIMO-OFDM system requires feedback of transmission beamforming vectors from the receiver to the transmitter.

In general, a very large number of subcarriers are used and thus a large amount of feedback information is sent. Although it is possible to decrease the feedback to some degree by limited feedback schemes proposed for the narrow-band MIMO system, the reduction of feedback is limited because of too large of a total number of subcarriers.

As a solution to the problem, a technique for interpolating transmission beamforming vectors has been proposed. Based on the fact that there is a relation between optimum transmission beamforming vectors of adjacent subcarriers, the receiver sends information about the transmission beamforming vectors of some of total subcarriers to the transmitter and the transmitter determines the transmission beamforming vectors of the other subcarriers by interpolating the received transmission beamforming vectors. A combined use of the interpolation technique and a codebook-based transmission beamforming technique can reduce feedback significantly in a broadband MIMO-OFDM transmission beamforming system.

Despite its ability to reduce feedback for a broadband channel, the conventional interpolation technique has drawbacks concerning the time-variant properties of the channel. In most mobile communication environments, channels vary over time and thus transmission beamforming vectors also change over time at the transmitter. Hence, the receiver has to continuously notify the transmitter of transmission beamforming vectors according to channel changes, requiring a large amount of feedback. Moreover, if the system has a processing delay, that is, if the transmission beamforming vectors from the receiver cannot be used immediately due to some factors like detection delay at the transmitter, the channel may change during the processing delay. As a consequence, even if the receiver optimizes the transmission beamforming vectors, they are not optimal at the transmitter any more.

Figure 1:
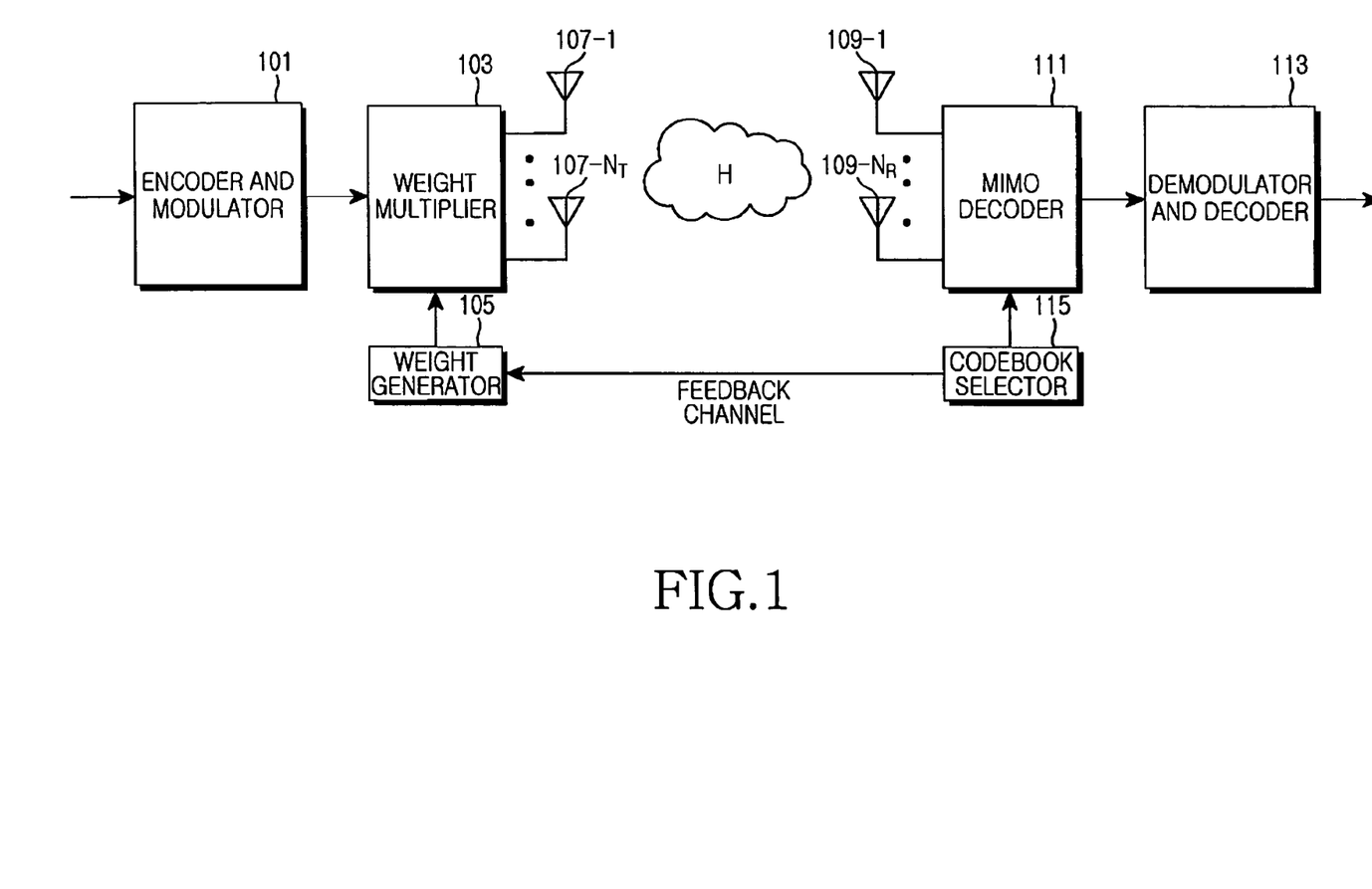
FIG. 1 is a block diagram of a typical feedback-based transmission beamforming system.

As background for the present invention, the conventional interpolation technique is described below. FIG. 1 is a block diagram of a typical feedback-based transmission beamforming system.

Referring to FIG. 1, a transmitter includes an encoder and modulator 101, a weight multiplier 103, a plurality of transmit antennas 107-1 to 107-$N_T$, and a weight generator 105. A receiver includes a plurality of receive antennas 109-1 to 109-$N_R$, a MIMO decoder 111, a demodulator and decoder 113, and a codebook selector 115

In the transmitter, the encoder and modulator 101 encodes transmission data in a predetermined coding scheme and generates complex symbols by modulating the coded data in a predetermined modulation scheme. The weight generator 105, which manages a codebook database, generates weight vectors (or beamforming vectors) according to a codebook index fed back from the receiver. The weight multiplier 103 multiplies the complex symbols by the beamforming vectors and sends the products through the transmit antennas 107-1 to 107-$N_T$.

In the receiver, signals received at the receive antennas 109-1 to 109-$N_R$ include added noise. The MIMO decoder 111 estimates a transmitted vector from the transmitter by decoding the vector of the received signals in a predetermined MIMO detection method. The demodulator and decoder 113 demodulates and decodes the estimated symbols, thereby recovering the original information data.

Meanwhile, the codebook selector 115 forms a channel matrix H by estimating channels using predetermined signals (e.g. pilot signals) received from the MIMO decoder 111 and detects optimum beamforming vectors based on the channel matrix H. A memory is utilized to store a codebook. The optimum beamforming vectors are created by operating beamforming vectors read from the memory with the channel matrix H. Then the indexes (or codebook indexes) of the selected beamforming vectors are fed back to the transmitter on a feedback channel. Since the transmitter also has the codebook, the receiver just feeds back the indexes of the beamforming vectors, thus decreasing the amount of feedback information. For example, if the codebook has eight beamforming vectors, the codebook indexes can be represented in three bits.

Without using any interpolation technique, the transmitter has to receive transmission beamforming vectors for all frames and all of N subcarriers to optimize link performance. Despite the codebook index-based feedback, this method requires a large amount of feedback. To solve the problem, interpolation is conventionally performed in frequency domain.

Figure 2:
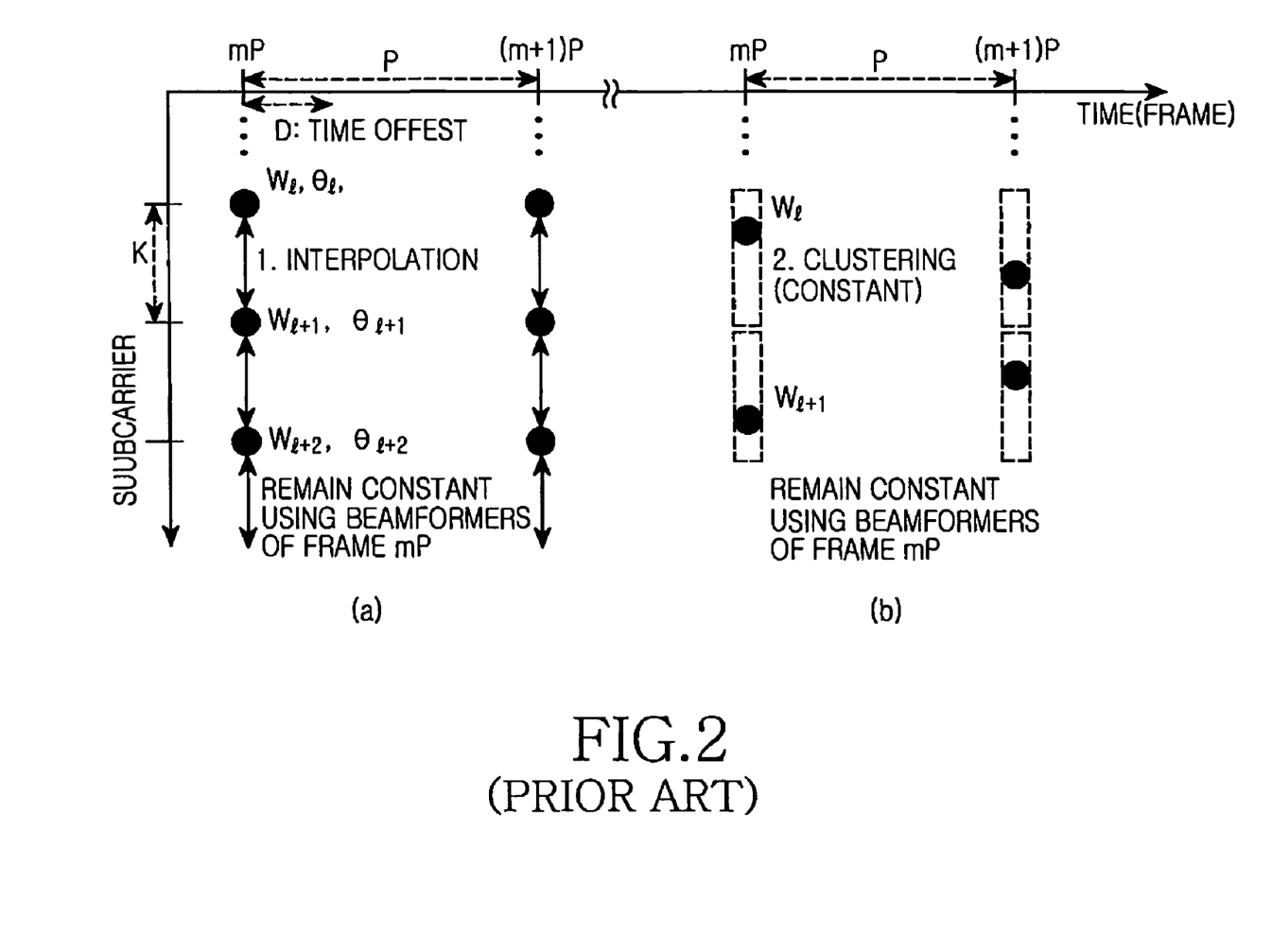
FIG. 2 illustrates beamforming vector interpolation techniques in a conventional transmission beamforming system.

FIG. 2 illustrates beamforming vector interpolation techniques in a conventional transmission beamforming system. In FIG. 2, reference character (a) represents linear interpolation on a multidimensional sphere, and reference character (b) represents zero-order interpolation using the same transmission beamforming vector in each predetermined cluster.

The linear interpolation technique (a) feeds back an optimum beamforming vector w for every K subcarriers and calculates the transmission beamforming vectors of the in-between (K−1) subcarriers. As much uncertainty as a complex constant that exists in the optimum transmission beamforming vector itself and phase information θ is fed back along with the optimum beamforming vector to compensate for the uncertainty. Despite the advantages of a significant decrease in feedback information and a lesser amount of computational complexity in determining the feedback information at the receiver, the linear interpolation (a) adds to feedback information due to the transmission of the phase information.

The zero-order interpolation (b) in FIG. 2 groups total subcarriers into clusters each having K successive subcarriers and determines a transmission beamforming vector for each cluster. Thus, this interpolation is one-dimensional clustering. The receiver selects an optimum beamforming vector (which maximizes Signal-to-Noise Ratio (SNR) or channel capacity) for the K subcarriers of each cluster and feeds back the codebook indexes of the beamforming vectors of the clusters to the transmitter. This interpolation method requires a relatively high computational complexity in determining feedback information at the receiver, although decreasing the amount of feedback information.

The conventional interpolation techniques substantially reduce feedback information compared to a scheme that does not use interpolation. Conventional techniques, however, have the problem of great performance degradation in a time-varying channel environment. Referring to FIG. 2, assuming that feedback information is delivered in an $mP^{th}$ frame, a channel variation is not significant when the feedback information arrives. Therefore, performance is not degraded much. However, the channel variation becomes very serious just before the next feedback time instant. What is worse, the performance degradation caused by the channel variation occurs every time feedback is performed. A real system experiences a processing delay of at least one frame from channel estimation at the receiver to use of transmission beamforming vectors based on the channel estimation at the transmitter. During the processing delay, the channel changes. Accordingly, there is a need for a transmission beamforming technique to be robust against time-variant channels.

SUMMARY OF THE INVENTION

An object of the present invention is to substantially solve at least the above problems and/or disadvantages and to provide at least the advantages below. Accordingly, an object of the present invention is to provide an apparatus and method for determining feedback information, taking a time-variant channel into account in a beamforming system.

Another object of the present invention is to provide an apparatus and method for determining feedback information based on channel prediction in a beamforming system.

A further object of the present invention is to provide an apparatus and method for determining feedback information according to a two-dimensional beamforming vector interpolation technique in a beamforming system.

Still another object of the present invention is to provide an apparatus and method for performing beamforming, taking a time-variant channel into account in a beamforming system.

Yet another object of the present invention is to provide an apparatus and method for performing beamforming according to a two-dimensional beamforming vector interpolation technique in a beamforming system.

Yet further object of the present invention is to provide an apparatus and method for improving transmission beamforming performance in a beamforming system.

The above objects are achieved by providing an apparatus and method for determining a beamforming vector in a codebook-based transmission beamforming system.

According to one aspect of the present invention, in a receiver in a codebook-based transmission beamforming system, a predictor generates forthcoming channel values for a forthcoming period using M present and previous channel estimates. An effective channel gain calculator calculates effective channel gains for all transmission beamforming vectors included in a codebook using the forthcoming channel values received from the predictor. A codebook selector feeds back a codebook index corresponding to the maximum effective channel gains received from the effective channel gain calculator to a transmitter.

According to another aspect of the present invention, in a feedback method for a receiver in a codebook-based transmission beamforming system, forthcoming channel values for a forthcoming period are generated using M present and previous channel estimates. Effective channel gains for all transmission beamforming vectors included in a codebook are calculated using the forthcoming channel values. A codebook index corresponding to the maximum effective channel gains is fed back to a transmitter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method of performing beamforming, taking a time-variant channel into account in a codebook-based transmission beamforming system. The present invention provides a two-dimensional interpolation technique based on the idea that the beamforming vector of a subcarrier is correlated with those of adjacent subcarriers and correlated with its past and future beamforming vectors, as well. In the present invention, a receiver forms feedback information based on the channel prediction of a forthcoming channel and sends it to a transmitter, expecting that feedback transmission beamforming information will be applied to the forthcoming channel. The feedback information is a codebook index indicating a transmission beamforming vector listed in a codebook, for example.

How the transmission beamforming vector of a forthcoming channel is estimated will first be described below.

A time gap exists between application of a transmission beamforming vector and decision of feedback information. The present invention uses an effective channel gain as a measure of transmission beamforming performance in the sense that the effective channel gain is closely related to error performance or channel capacity. Assuming that the processing delay of the system is '0' and a feedback interval P is larger than the number M of current and previous channel estimates used as observed values, the expected effective channel gain of a $d^{th}$ frame after feedback is calculated by the following Equation (1), given a transmission beamforming vector w.

$$J_{k,d}(w) = E[\|H(k,mP+d)w\|^2 | H(k,mP), \ldots, H(k,mP-M-1)] \quad (1)$$

where H(k, n) represents an Mr×Mt channel matrix for a $k^{th}$ subcarrier at an $n^{th}$ frame index (i.e. time). Here, Mr is the number of receive antennas at the receiver and Mt is the number of transmit antennas at the transmitter. H(k, mP+d) is a value in a probability process, highly time-correlated with previous channels. To represent this correlation, the channel is modeled to an Auto-Regressive (AR) model in the present invention. Using M observed present and previous channel estimates, the AR-modeled H(k, mP+d) is expressed as Equation (2):

$$H_{AR}(k, mP+d) = -\sum_{k=0}^{d-1} \alpha_d(k)H(mP+d-k) - \sum_{k=0}^{M+d-1} \alpha_d(k)H(mP+d-k) + \beta_d(0)G(n+d) \quad (2)$$

On the right-hand side of equation (2), the second term is based on observation and the third term is an innovation term being an independent and identically distributed (i.i.d) Gaussian probability variable matrix with all elements normalized to 1.

The first term on the right-hand side is about a forthcoming channel, as seen from the present. Channel values corresponding to this term are also probability variables. The channels included in the first term of the right-hand side are AR-modeled based on present and previous observed channel values, expressed as Equation (3):

$$H_{AR}(k, mP+d) = -\sum_{k=0}^{M-1} \tilde{\alpha}(k)H(mP-k) + \sum_{k=0}^{d-1} \tilde{\beta}(0)G(n+d-k) \quad (3)$$

where a model coefficient $-\tilde{a}$ is equal to the tap coefficient of a linear Minimum Mean Square Error (MMSE) predictor for H(k, mP+d) when H(k, mP), . . . , H(k, mP−M−1) are given. Therefore, H(k, mP+d) is finally given as Equation (4)

$$H_{AR}(k, mP+d) = \hat{H}_{MMSE}(k, mP+d) + \sum_{k=0}^{d-1} \tilde{\beta}(0)G(n+d-k) \quad (4)$$

Using Equation (4), the effective channel gain is fully expressed as Equation (5):

$$J_{k,d}(w) = w^H E[H^H(k, mP+d)H(k, mP+d) | H(k, mP), \quad (5)$$
$$\ldots, H(k, mP-M+1)]w$$
$$= w^H \hat{H}_{MMSE}(k, mP+d)\hat{H}_{MMSE}(k, mP+d)w +$$
$$\sum_{k=0}^{d-1} |\tilde{\beta}(k)|^2 \cdot w^H I_{M_t} w$$
$$= w^H \hat{H}_{MMSE}(k, mP+d)\hat{H}_{MMSE}(k, mP+d)w +$$
$$\sum_{k=0}^{d-1} |\tilde{\beta}(k)|^2 \cdot \|w\|^2$$

Hence, given H(k, mP), . . . , H(k, mP−M+1), an optimum transmission beamforming vector maximizing the effective channel gain is an eigenvector corresponding to the maximum eigenvalue of a matrix given as Equation (6)

$$R(k,mP+d) = \hat{H}_{MMSE}^H(k,mP+d)\hat{H}_{MMSE}(k,mP+d) \quad (6)$$

If a codebook is used for limited feedback, a transmission beamforming vector maximizing Equation (7) is selected from among transmission beamforming vectors listed in the codebook.

$$j'_{k,d}(w) = w^H R(k,mP+d)w \quad (7)$$

In this way, given transmission beamforming vectors for the $k^{th}$ subcarrier and forthcoming time instants, effective channel gains are calculated and an optimum transmission beamforming vector maximizing the effective channel gain is selected.

Figure 3:
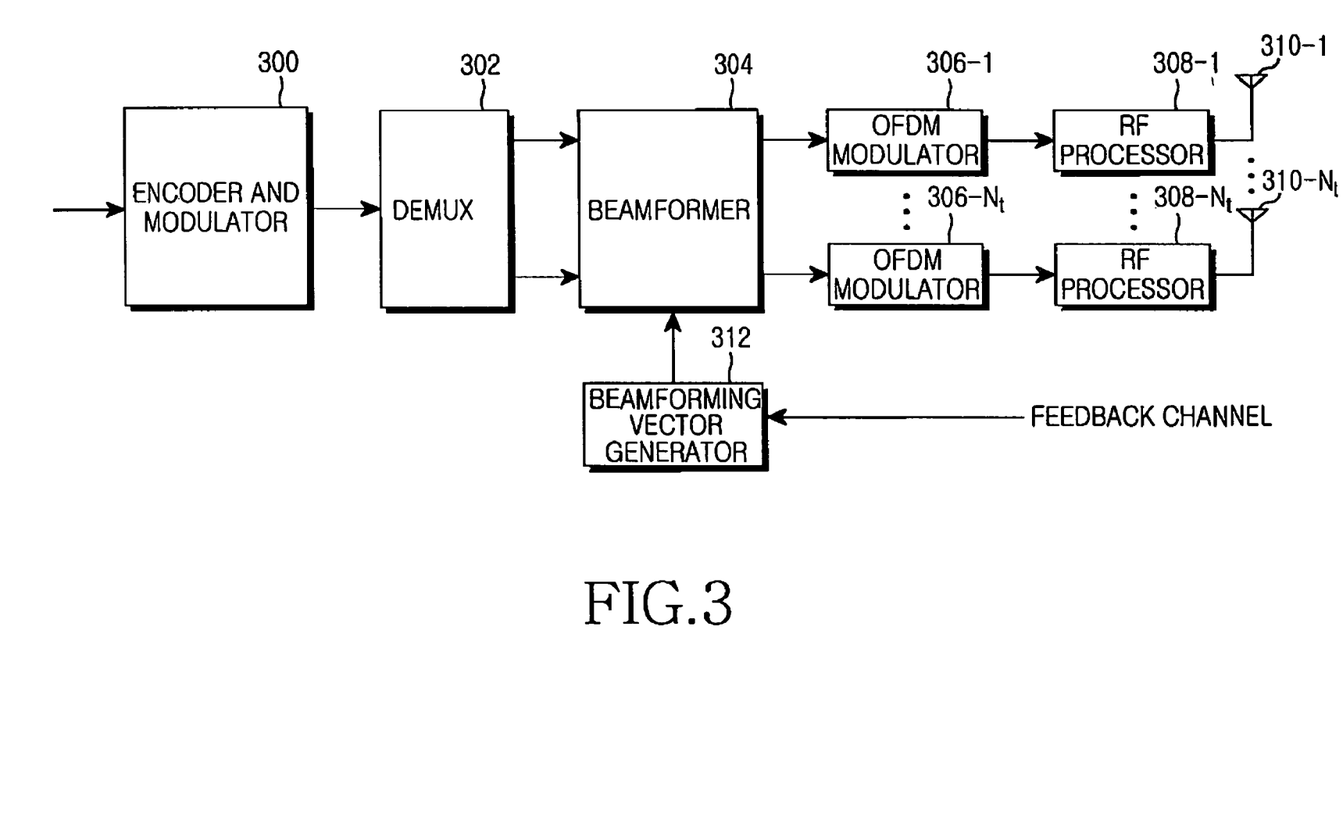
FIG. 3 is a block diagram of a transmitter in a MIMO-OFDM communication system according to the present invention.

FIG. 3 is a block diagram of a transmitter in a MIMO-OFDM communication system according to the present invention. Referring to FIG. 3, the transmitter includes an encoder and modulator 300, a demultiplexer (DEMUX) 302, a beamformer 304, a plurality of OFDM modulators 306-1 to 306-$N_t$, a plurality of Radio Frequency (RF) processors 308-1 to 308-$N_t$, a plurality of transmit antennas 310-1 to 310-$N_t$, and a beamforming vector generator 312.

In operation, the encoder and modulator 300 encodes transmission data in a predetermined coding scheme (e.g. convolutional coding, turbo coding, etc.) and generates complex symbols by modulating the coded data in a predetermined modulation scheme (e.g. Quadrature Phase Shift Keying (QPSK), 16-ary Quadrature Amplitude Modulation (16QAM), etc.). The DEMUX 302 demultiplexes the complex symbols.

The beamforming vector generator 312 manages a codebook database and creates transmission beamforming vectors (or weight vectors) according to codebook indexes received on a feedback channel.

The beamforming vector generator 312 receives codebook indexes for a forthcoming channel acquired by channel prediction. If one weight is applied to each cluster of predetermined clusters each defined by K subcarriers and P frames, one codebook index per cluster is received. If weights are applied to each of predetermined clusters each defined by 2K subcarriers and P frames, two codebook indexes per cluster are received. In the latter case, the beamforming vector generator 312 interpolates weights corresponding to two feedback codebook indexes and provides the resulting transmission beamforming vectors to the beamformer 304.

The beamformer 304 multiplies the complex symbols received from the DEMUX 302 by the weights received from the beamforming vector generators 312. A first antenna signal is provided to the first OFDM modulator 306-1 and an $N_t^{th}$ antenna signal to the $N_t^{th}$ antenna 306-$N_t$.

The first OFDM modulator 306-1 OFDM-modulates the first antenna signal. The OFDM modulation involves an Inverse Fast Fourier Transform (IFFT) of the transmission signal and adding a Cyclic Prefix (CP) to the IFFT data, for generation of an OFDM symbol. In the same manner, the $N_t^{th}$ OFDM modulator 306-$N_t$ OFDM-modulates the $N_t^{th}$ antenna signal.

The RF processors 308-1 to 308-$N_t$ convert data received from their corresponding OFDM modulators 306-1 to 306-$N_t$ to analog data and process the analog data to RF signals for transmission in the air. Then the RF signals are sent through the corresponding transmit antennas 310-1 to 310-$N_t$.

Figure 4:
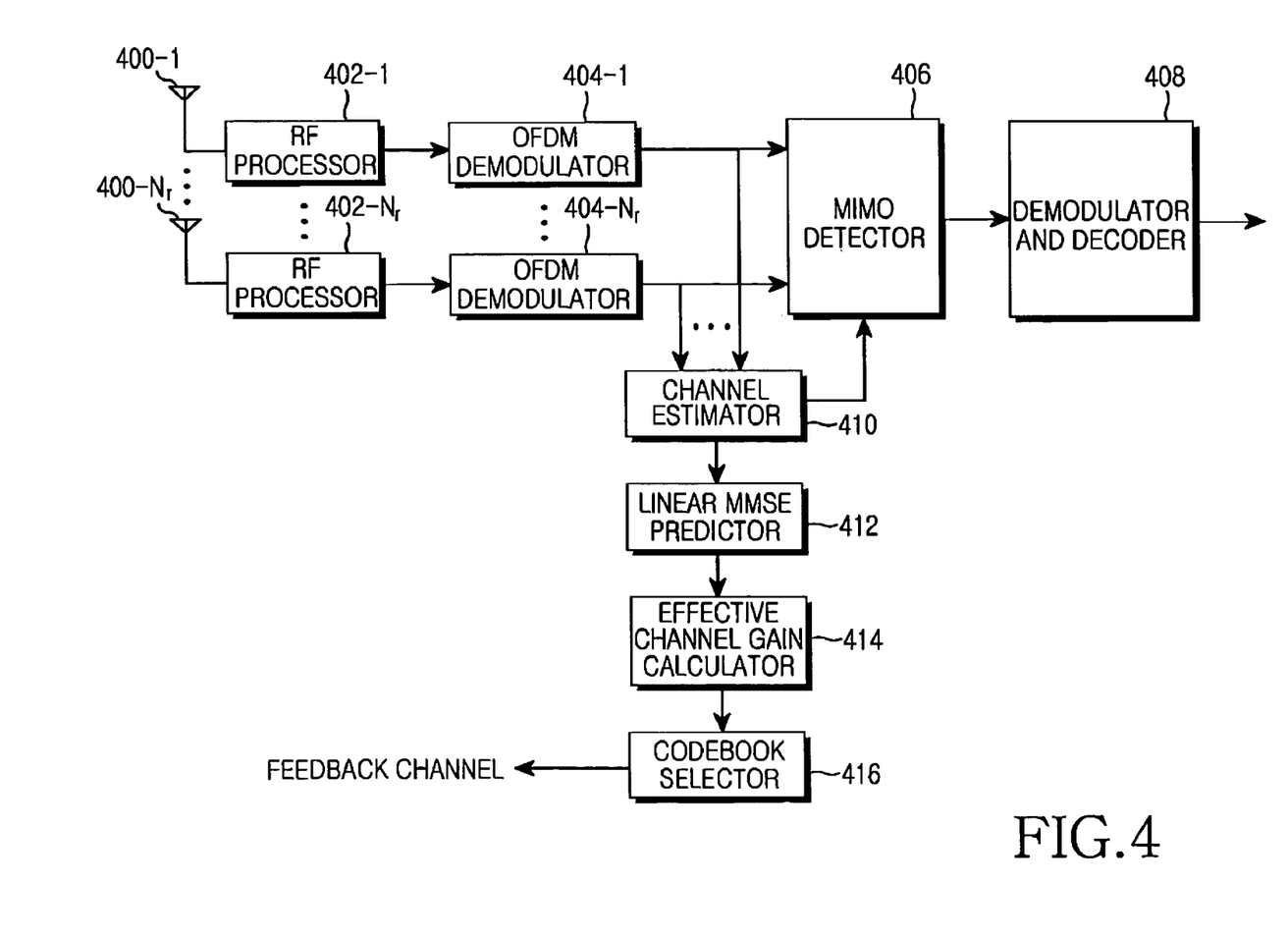
FIG. 4 is a block diagram of a receiver in the MIMO-OFDM communication system according to the present invention.

FIG. 4 is a block diagram of a receiver in the MIMO-OFDM communication system according to the present invention. Referring to FIG. 4, the receiver includes a plurality of receive antennas 400-1 to 400-$N_r$, a plurality of RF processors 402-1 to 402-$N_r$, a plurality of OFDM demodulators 404-1 to 404-$N_r$, a MIMO detector 406, a demodulator and decoder 408, a channel estimator 410, a linear MMSE predictor 412, an effective channel gain calculator 414, and a codebook selector 416.

In operation, the receive antennas 400-1 to 400-$N_r$ receive signals from the transmit antennas of the transmitter. The RF processors 402-1 to 402-$N_r$ downconvert RF signals received from the corresponding receive antennas 400-1 to 400-$N_r$ to baseband signals and convert the baseband signals to sample data.

The OFDM demodulators 404-1 to 404-$N_r$ OFDM-demodulate the sample data received from the corresponding RF processors 402-1 to 402-$N_r$. The OFDM demodulation involves elimination of a CP from a received signal and Fast Fourier Transform (FFT) of the CP-free sample data.

The MIMO detector 406 estimates a transmitted vector by decoding received vectors from the OFDM demodulators 404-1 to 404-$N_r$ in a predetermined MIMO detection method. The MIMO detection method can be Maximum Likelihood (ML), Modified ML (MML), Zero Forcing (ZF), MMSE, Successive Interference Cancellation (SIC), or Vertical Bell Labs Layered Space-Time (V-BLAST). The demodulator and decoder 408 demodulates and decodes the estimated symbols, thereby recovering the original information data.

Meanwhile, the channel estimator 410 extracts predetermined signals (e.g. preamble signals, pilot signals, etc.) from the OFDM-demodulated signals received from the OFDM demodulators 404-1 to 404-$N_r$ and estimates channel values using the extracted signals. These channel estimates can be used in estimating the transmitted vector by the MIMO detector 406 and later selecting codebook indexes by the codebook selector 416. According to the present invention, the channel estimator 410 buffers M present and previous channel estimates.

The linear MMSE predictor 412 predicts performs a linear MMSE prediction algorithm using the M channel estimates of forthcoming channel values ($\hat{H}$(k, mP+d), k is a subcarrier index P is a feedback interval expressed as the number of frames, m is a feedback index, and d is a time offset).

The effective channel gain calculator 414 calculates effective channel gains for each beamforming vectors (or beamforming vector pair) by the algorithm of Equation (7) using the forthcoming channel values and the beamforming vectors of the codebook and selects a minimum effective channel gain for each beamforming vector (or beamforming vector pair). That is, the effective channel gain calculator 414 outputs a plurality of minimum effective channel gains for one cluster (time-frequency resources). Depending on an interpolation scheme for time-frequency resources, an effective channel gain can be calculated by applying the same weight to the same cluster, or by applying a different weight to each subcarrier in the same cluster, described with reference to FIGS. 7 and 8.

The codebook selector 416 selects the maximum of minimum effective channel gains for forthcoming time-frequency resources (cluster) received from the effective channel gain calculator 414 and feeds back a codebook index corresponding to the maximum effective channel gain to the transmitter. The number of codebook indexes for the forthcoming time-frequency resources is 1 or 2 depending on the interpolation scheme for the time-frequency resources.

As described above, the receiver decides a transmission beamforming vector (i.e. a codebook index) to be used for P forthcoming frames based on present and previous channel estimates and feeds back the transmission beamforming vector. The transmitter generates a transmission beamforming vector for the P frames based on the received feedback information.

A description of a two-dimensional interpolation technique according to the present invention is provided below.

Figure 7:
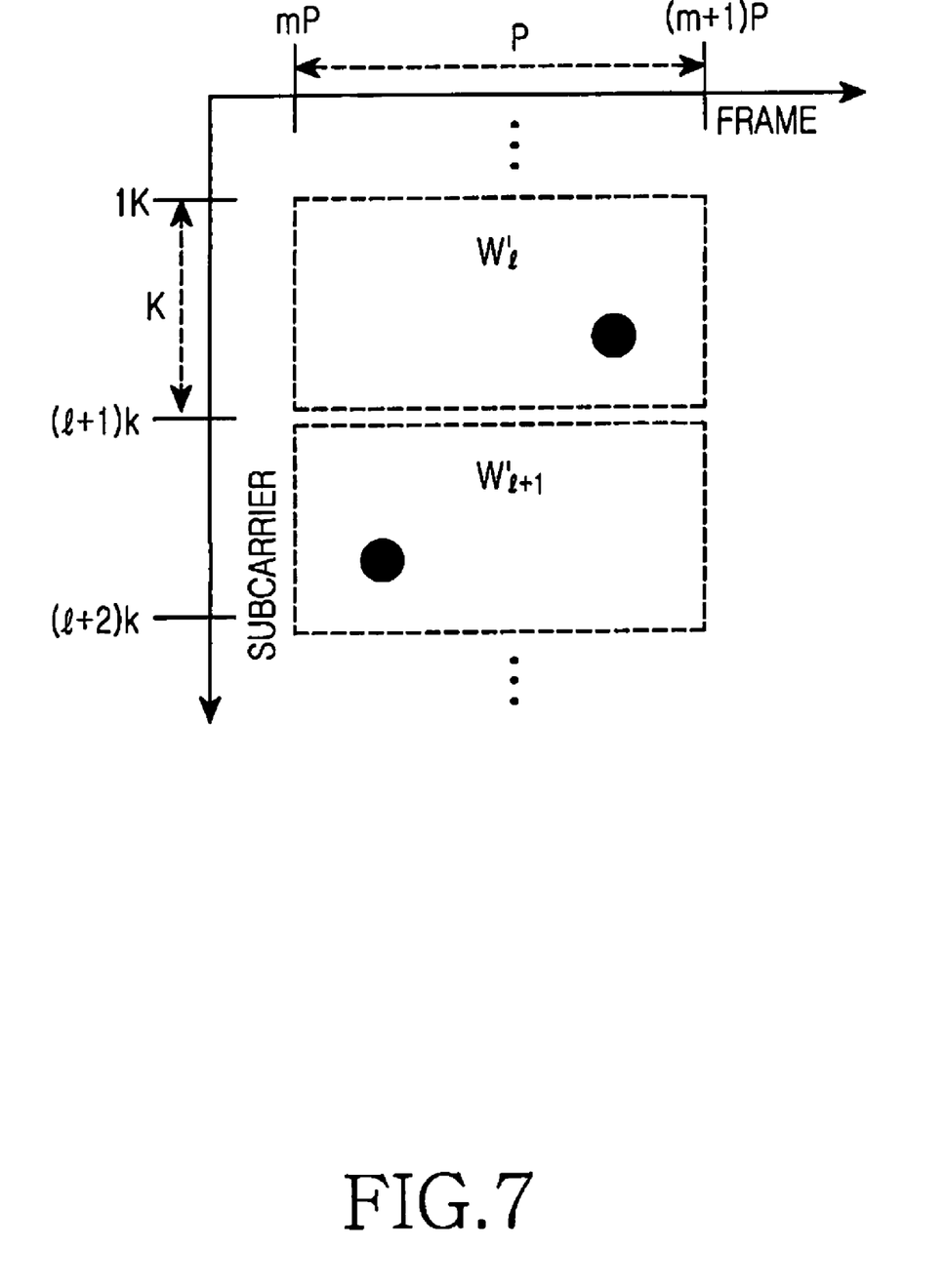
FIG. 7 illustrates a two-dimensional interpolation technique according to the present invention.

FIG. 7 illustrates a two-dimensional interpolation technique according to the present invention. Referring to FIG. 7, clusters of size K×P, where K is the number of subcarriers and P is the number of frames, are predefined in the time-frequency domain. The receiver feeds back codebook indexes for the clusters to the transmitter and the transmitter uses transmission beamforming vectors corresponding to the codebook indexes for the clusters. The codebook index for each of the clusters is given as Equation (8) such that a minimum SNR is maximized.

$$w'_{1,m} = \arg\max_{w \in \Omega} \min_{\substack{0 \le k \le K-1 \\ 0 \le d \le P-1}} J_{1K+k,d}(w) \tag{8}$$

where $\Omega$ represents the codebook.

Figure 8:
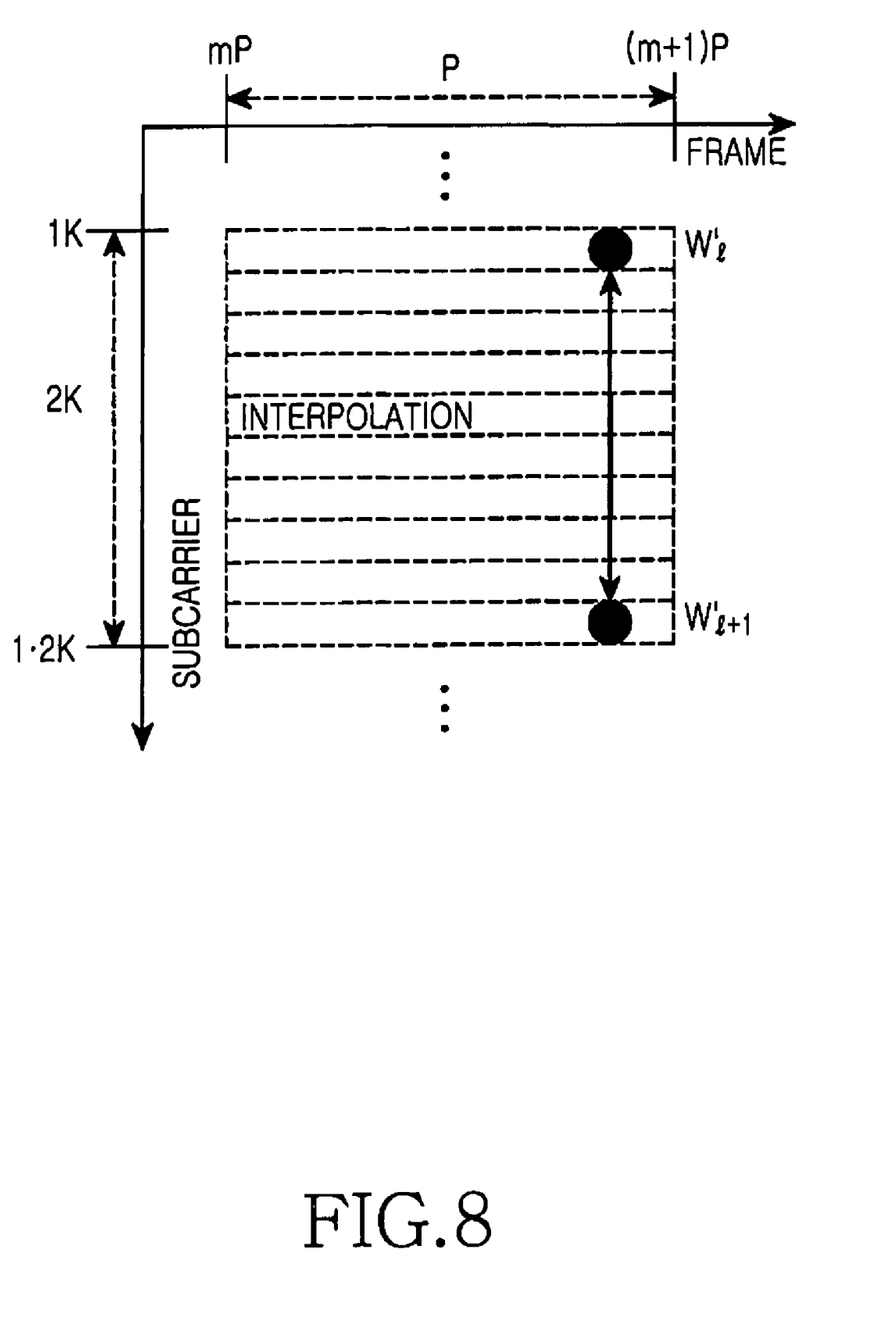
FIG. 8 illustrates a two-dimensional interpolation technique according to the present invention.

FIG. 8 illustrates a two-dimensional interpolation technique according to the present invention. Referring to FIG. 8, clusters of size 2K×P, where K is the number of subcarriers and P is the number of frames, are predefined in the time-frequency domain. The receiver feeds back two codebook indexes for each cluster to the transmitter and the transmitter creates a transmission beamforming vector for each subcarrier in each cluster by linear interpolation using the two codebook indexes. The transmission beamforming vectors of the other subcarriers are created using two transmission beamforming vectors in the following manner.

Transmission beamforming vectors for the remaining (2K−2) subcarriers are generated by linear interpolation of two transmission beamforming vectors for subcarriers at both ends in a frequency area. The transmission beamforming vectors are constant in every time frame. Two codebook indexes for each cluster are given as Equation (9) such that a minimum SNR is maximized.

$$(w'_l, w'_{l+1}) = \arg \max_{(w_1, w_2) \in \Omega^c} \min_{\substack{0 \le k \le K-1 \\ 0 \le d \le P-1}} J_{l \cdot 2K+k,d}(w(l \cdot 2K + k; w_1, w_2)) \quad (9)$$

$$\text{where } w(l \cdot 2K + k; w_1, w_2) = \frac{(1-\alpha)w_1 + \alpha_k w_2}{\|(1-\alpha)w_1 + \alpha_k w_2\|}$$

where the lower equation is a mathematical representation of the linear interpolation.

Figure 5:
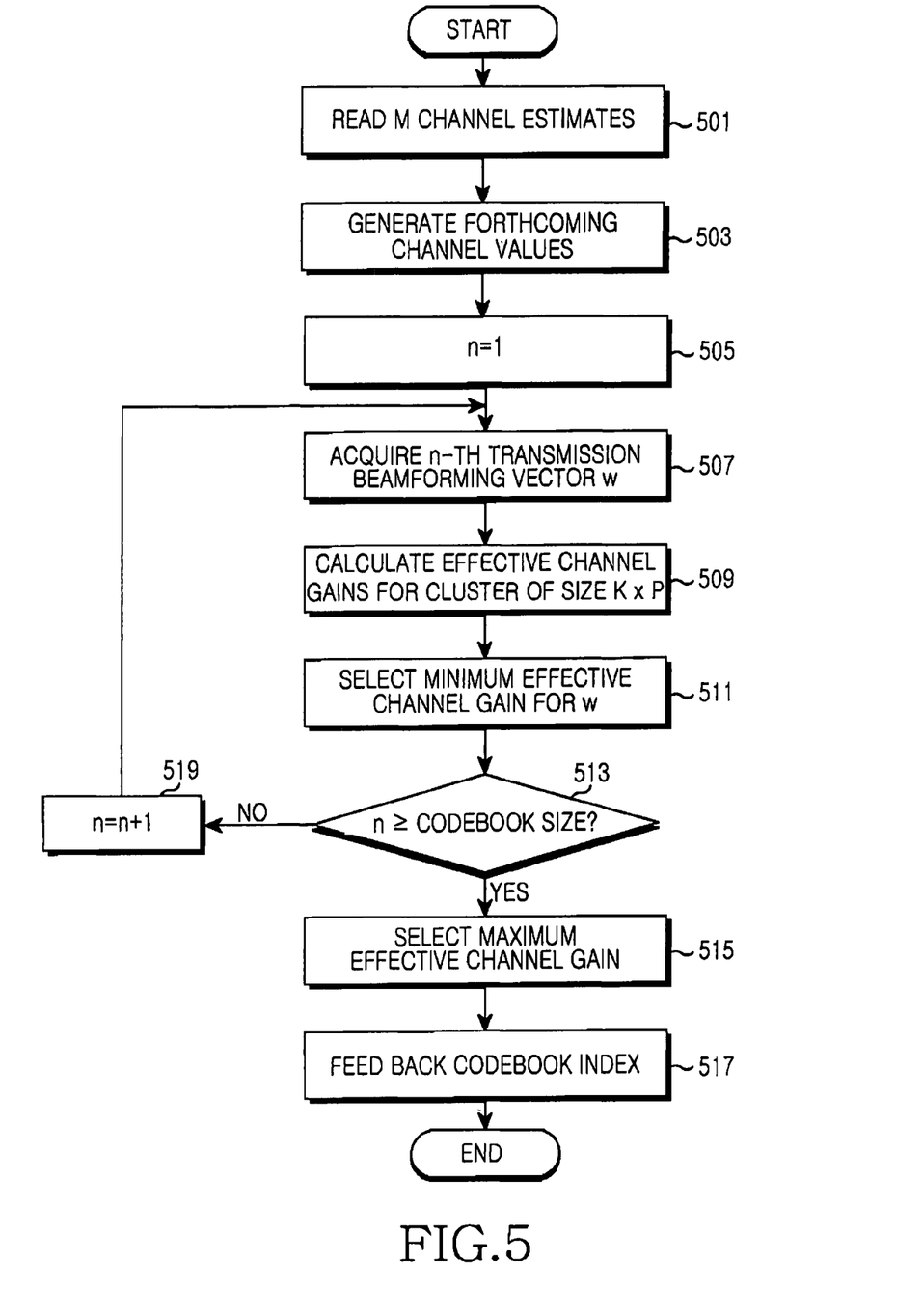
FIG. 5 is a flowchart illustrating an operation for determining and feeding back a codebook index in the receiver according to the present invention.

FIG. 5 is a flowchart illustrating an operation for determining and feeding back a codebook index in the receiver according to the present invention. Referring to FIG. 5, the receiver reads M present and previous channel estimates from a memory in step 501 and generates channel values for forthcoming time-frequency resources (or cluster) using the M channel estimates by an $M^{th}$-order linear MMSE prediction algorithm in step 503. It is assumed that the size of a cluster is K×P, where K is the number of subcarriers and P is the number of frames, as illustrated in FIG. 7. That is, K×P forthcoming channel values are generated.

The receiver sets a variable indicating a codebook index, n, to an initial value 1 in step 505 and acquires an $n^{th}$ transmission beamforming vector w from the codebook in step 507. In step 509, the receiver calculates K×P effective channel gains for the $n^{th}$ transmission beamforming vector w in the cluster. The receiver selects the minimum of the effective channel gains in step 511.

In step 513, the receiver compares n with the size of the codebook. If n is less than the codebook size, the receiver increases n by 1 in step 519 and then returns to step 507. If n is greater then or equal to the codebook size, the receiver selects the maximum of minimum effective channel gains for all codebook indexes in the cluster in step 515 and feeds back a codebook index corresponding to the maximum effective channel gain to the transmitter on a feedback channel in step 517. Thus, the transmitter uses the same transmission beamforming vector indicted by the codebook index for subcarriers of the cluster.

Figure 6:
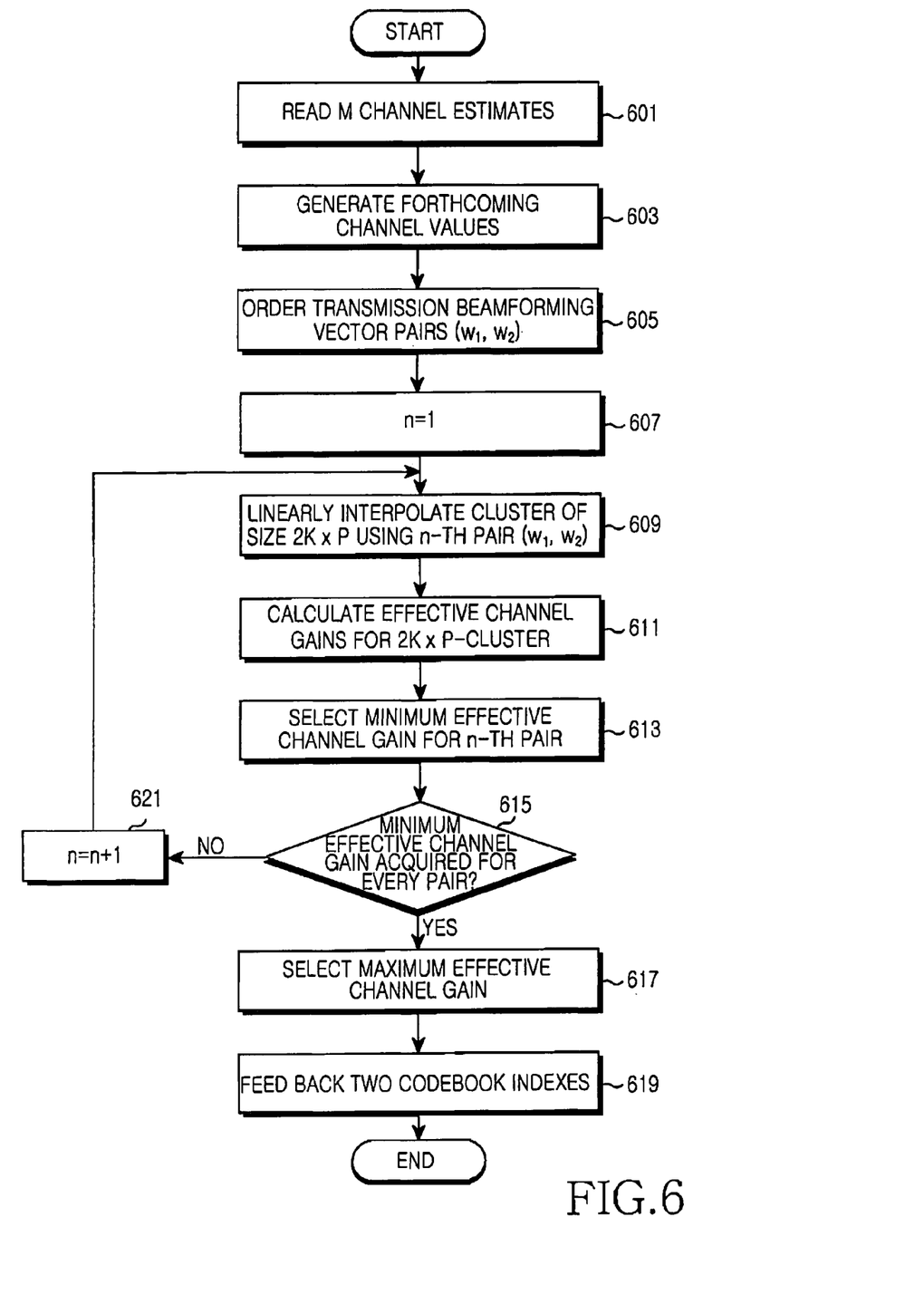
FIG. 6 is a flowchart illustrating an operation for determining and feeding back a codebook index in the receiver according to the present invention.

FIG. 6 is a flowchart illustrating an operation for determining and feeding back a codebook index in the receiver according to the present invention. Referring to FIG. 6, the receiver reads M present and previous channel estimates from the memory in step 601 and generates channel values for forthcoming time-frequency resources (or cluster) using the M channel estimates by an $M^{th}$-order linear MMSE prediction algorithm in step 603. It is assumed that the size of a cluster is 2K×P, where K is the number of subcarriers and P is the number of frames, as illustrated in FIG. 8. That is, 2K×P forthcoming channel values are generated.

The receiver orders the transmission beamforming vectors of the codebook in pairs ($w_1$, $w_2$) in step 605 and sets a variable indicating a beamforming vector pair index n to an initial value 1 in step 607. The receiver acquires an $n^{th}$ beamforming vector pair ($w_1$, $w_2$) and linearly interpolates the cluster using two transmission beamforming vectors of the beamforming vector pair in step 609. As a result, the receiver acquires 2K×P transmission beamforming vectors for use in the cluster.

Then the receiver calculates 2K×P effective channel gains for the 2K×P transmission beamforming vectors, i.e. for the $n^{th}$ beamforming vector pair in the cluster in step 611. The receiver selects the minimum of the effective channel gains in step 613.

In step 615, the receiver determines whether minimum effective channel gains have been acquired for all beamforming vector pairs. If there is any beamforming vector pair for which minimum effective channel gains are to be calculated, the receiver increases n by 1 in step 621 and then returns to step 607. If minimum effective channel gains have been acquired for all beamforming vector pairs, the receiver selects the maximum of minimum effective channel gains in the cluster in step 617 and feeds back two codebook indexes corresponding to the maximum effective channel gain to the transmitter on the feedback channel in step 619. Thus, the transmitter generates a transmission beamforming vector for each subcarrier in the cluster by linear interpolation using the two feedback codebook indexes.

The present invention was simulated to verify its performance. The performance was evaluated in terms of Bit Error Rate (BER) without channel coding. The simulation was performed under the following conditions.

20 MHz bandwidth, 5 msec frame (WiBro frame duration)
  4 Tx, 2Rx antennas, 64 total subcarriers, 16CPs
  no channel coding
  2.3 GHz carrier frequency and 4 km/h mobile speed (Jakes model)
  15 multipath taps (ETSI model) and no spatial correlation
  assume that channel is perfectly estimated at the receiver
  the size of codebook [3]: 16 (4 bits)
  for 1-D linear sphere interpolator, 2 bits per each phase information
  6-th order LMMSE predictor (M=6)
  feedback rate: frequency K=8 & Time (frame) P (table)

| Value of P | 1D-sphere linear interpolator | 1D-clustering | 2D-clustering | 2D-linear clustering |
|---|---|---|---|---|
| Case 1 | 6 frames | 4 frames | 4 frames | 4 frames |
| Case 2 | 12 frames | 8 frames | 8 frames | 8 frames |

Figure 9A:
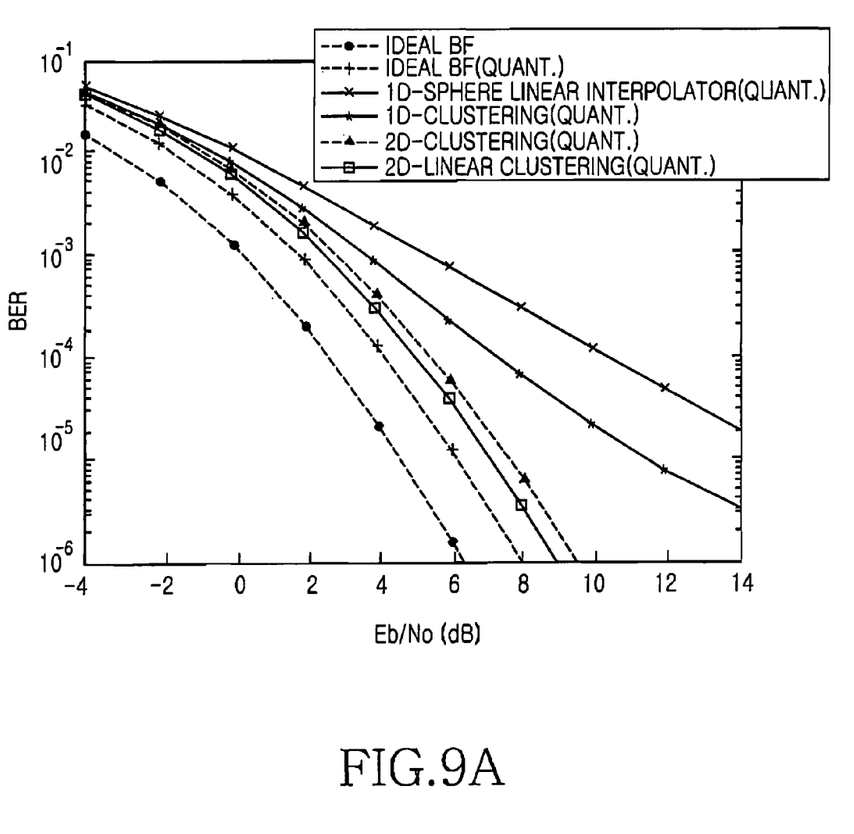
FIGS. 9A and 9B are graphs illustrating simulation results that verify the performance of the present invention.
Figure 9B:
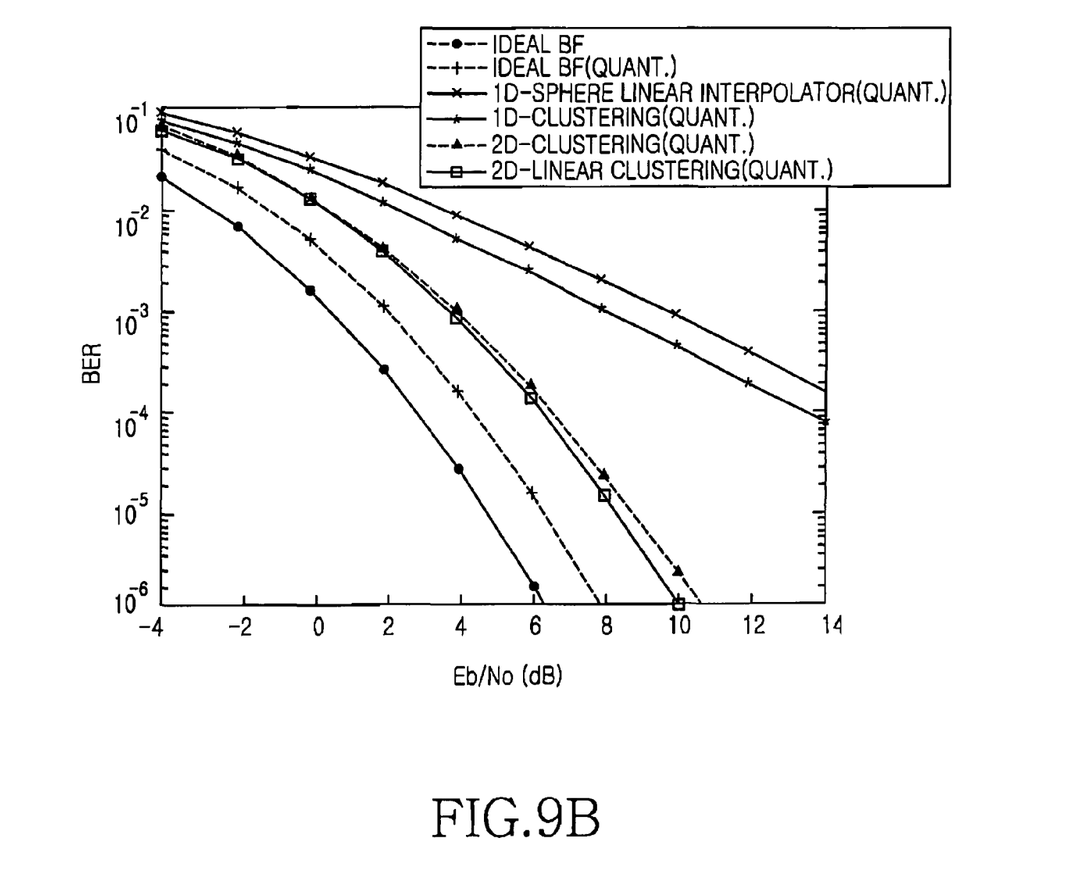

FIG. 9A illustrates simulation results for case 1 and FIG. 9B illustrates simulation results for case 2. In the simulation, four interpolation techniques and a no-interpolation case were considered. The same interpolation unit in frequency, K was applied to all interpolation techniques. A feedback interval P in time was adjusted to create the same amount of feedback in all of the interpolation techniques. Case 1 uses a relatively short feedback interval and case 2 uses a relatively long feedback interval. It is assumed that the channel estimation of the receiver is perfect because a channel can be estimated very accurately using preambles and pilots in each frame on the downlink.

Referring to FIG. 9A, it is noted that the channel prediction-based two-dimensional interpolation method of the present invention produces higher performance gains than a conventional one-dimensional interpolation technique. One thing to note here is that two-dimensional linear clustering (2D-Linear clustering) performs almost as well as an ideal quantization-based beamforming (Ideal BF (Quant.)) in which a transmission beamforming vector is selected from a codebook under the assumption of full knowledge of a channel for all time instants and all subcarriers. The 2D clustering of the present invention has very high performance, requiring a computational complexity that is not too high.

Referring to FIG. 9B, a channel varies greater in case 2 than in case 1. Therefore, there is a wider difference between the conventional 1D frequency interpolation technique and the proposed 2D interpolation. The proposed 2D interpolation performs slightly poorer in case 2 than in case 1, as channel estimation error increases. Compared to the proposed 2D interpolation, the conventional 1D frequency interpolation demonstrates serious performance degradation since it is not adapted to channel variations.

As described above, the present invention provides 2D (time-frequency) transmission beamforming vector interpolation techniques for producing optimum performance using limited feedback in a MIMO-OFDM transmission beamforming system. It was verified by the simulation that the proposed techniques perform better than the conventional techniques, and the performance improvement increases as a channel variation becomes great. The proposed techniques are applicable to a MIMO-OFDM system using irreversible channels between transmission and reception and a feedback channel.

Since feedback information is determined taking a time-variant channel in a codebook-based transmission beamforming system, the present invention advantageously improves link performance. That is, since a transmission beamforming vector is decided by channel prediction, performance degradation caused by non-adaptation to channel change. Also, it is guaranteed that the beamforming vector generated based on the feedback information is optimal to a particular time period. That is, an upper-layer scheduler does not need consider the inaccuracy of the feedback information.

While the invention has been shown and described with reference to certain preferred embodiments thereof, it will be understood by those skilled in the art that various changes in form and details may be made therein without departing from the spirit and scope of the invention, as defined by the appended claims.

What is claimed is:

1. A receiver in a codebook-based transmission beamforming system, comprising:
   a predictor for generating forthcoming channel values for a forthcoming period using M present and previous channel estimates;
   an effective channel gain calculator for calculating effective channel gains for transmission beamforming vectors included in a codebook using the forthcoming channel values generated by the predictor; and
   a codebook selector for feeding back a codebook index corresponding to the maximum effective channel gains received from the effective channel gain calculator to a transmitter;
   wherein the effective channel gain calculator calculates effective channel gains $j_{k,d}(w)$ for each transmission beamforming vector w by $$J_{k,d}(w)=w^H R(k,mP+d)w$$

$$R(k,mP+d)=\hat{H}_{MMSE}^H(k,mP+d)\hat{H}_{MMSE}(k,mP+d)$$

where $\hat{H}_{MMSE}$ is a forthcoming channel value, k is a subcarrier index, P is a feedback interval, m is a feedback index, and d is a time offset.

2. The receiver of claim 1, wherein the predictor is a linear Minimum Mean Square Error (MMSE) predictor.

3. The receiver of claim 1, wherein the forthcoming period is a predetermined time-frequency area defined by a plurality of subcarriers and a plurality of frames.

4. The receiver of claim 1, wherein the effective channel gain calculator calculates effective channel gains for each transmission beamforming vector included in the codebook for a forthcoming cluster of size K×P, where K is a number of subcarriers and P is a number of frames, using the forthcoming channel values and selects a minimum effective channel gains.

5. The receiver of claim 4, wherein the codebook selector compares the minimum effective channel gains for all the beamforming vectors received from the effective channel gain calculator, selects the maximum of the minimum effective channel gains, and feeds back one codebook index corresponding to the maximum effective channel gain to the transmitter.

6. The receiver of claim 1, wherein the effective channel gain calculator linearly interpolates a forthcoming cluster of size 2K×P, where K is a number of subcarriers and P is a number of frames, using two beamforming vectors included in the codebook, calculates effective channel gains for the beamforming vector pair for the linearly interpolated cluster using the forthcoming channel values, and selects the minimum of the effective channel gains.

7. The receiver of claim 6, wherein the codebook selector compares the minimum effective channel gains for all beamforming vector pairs received from the effective channel gain calculator, selects the maximum of the minimum effective channel gains, and feeds back two codebook indexes corresponding to the maximum effective channel gain to the transmitter.

8. A feedback method for a receiver in a codebook-based transmission beamforming system, comprising the steps of:
   generating forthcoming channel values for a forthcoming period using M present and previous channel estimates;
   calculating effective channel gains for transmission beamforming vectors included in a codebook using the forthcoming channel values; and
   feeding back a codebook index corresponding to the maximum effective channel gains to transmitter.
   wherein the calculation step comprises calculating effective channel gains $j_{k,d}(w)$ for each transmission beamforming vector w by $$j_{k,d}(w)=w^H R(k,mP+d)w$$

$$R(k,mP+d)=\hat{H}_{MMSE}^H(k,mP+d)\hat{H}_{MMSE}(k,mP+d)$$

where $\hat{H}_{HMMsE}$ is a forthcoming channel value, k is a subcarrier index. P is a feedback interval, m is a feedback index, and d is a time offset.

9. The feedback method of claim 8, wherein the forthcoming channel values are generated in a linear Minimum Mean Square Error (MMSE) predictor.

10. The feedback method of claim 8, wherein the forthcoming period is a predetermined time-frequency area defined by a plurality of subcarriers and a plurality of frames 11. The feedback method of claim 8, wherein the calculation step comprises:
   calculating effective channel gains for each transmission beamforming vector included in the codebook for a forthcoming cluster of size K×P, where K is a number of subcarriers and P is a number of frames, using the forthcoming channel values; and
   selecting a minimum of the effective channel gains for the each transmission beamforming vector.

12. The feedback method of claim 11, wherein the feedback step comprises:

comparing the minimum effective channel gains for all the beamforming vectors and selecting the maximum of the minimum effective channel gains; and feeding back one codebook index corresponding to the maximum effective channel gain to the transmitter.

13. The feedback method of claim 8, wherein the calculation step comprises:

linearly interpolating a forthcoming cluster of size 2K×P, where K is a number of subcarriers and P is a number of frames, using two beamforming vectors included in the codebook;

calculating effective channel gains for the beamforming vector pair for the linearly interpolated cluster using the forthcoming channel values; and selecting the minimums of effective channel gains for all beamforming vector pairs.

14. The feedback method of claim 13, wherein the feedback step comprises:

comparing the minimum effective channel gains for all the beamforming vector pairs;

selecting the maximum of the minimum effective channel gains; and feeding back two codebook indexes corresponding to the maximum effective channel gain to the transmitter.

* * * * *